United States Patent Office 3,406,908
Patented Oct. 22, 1968

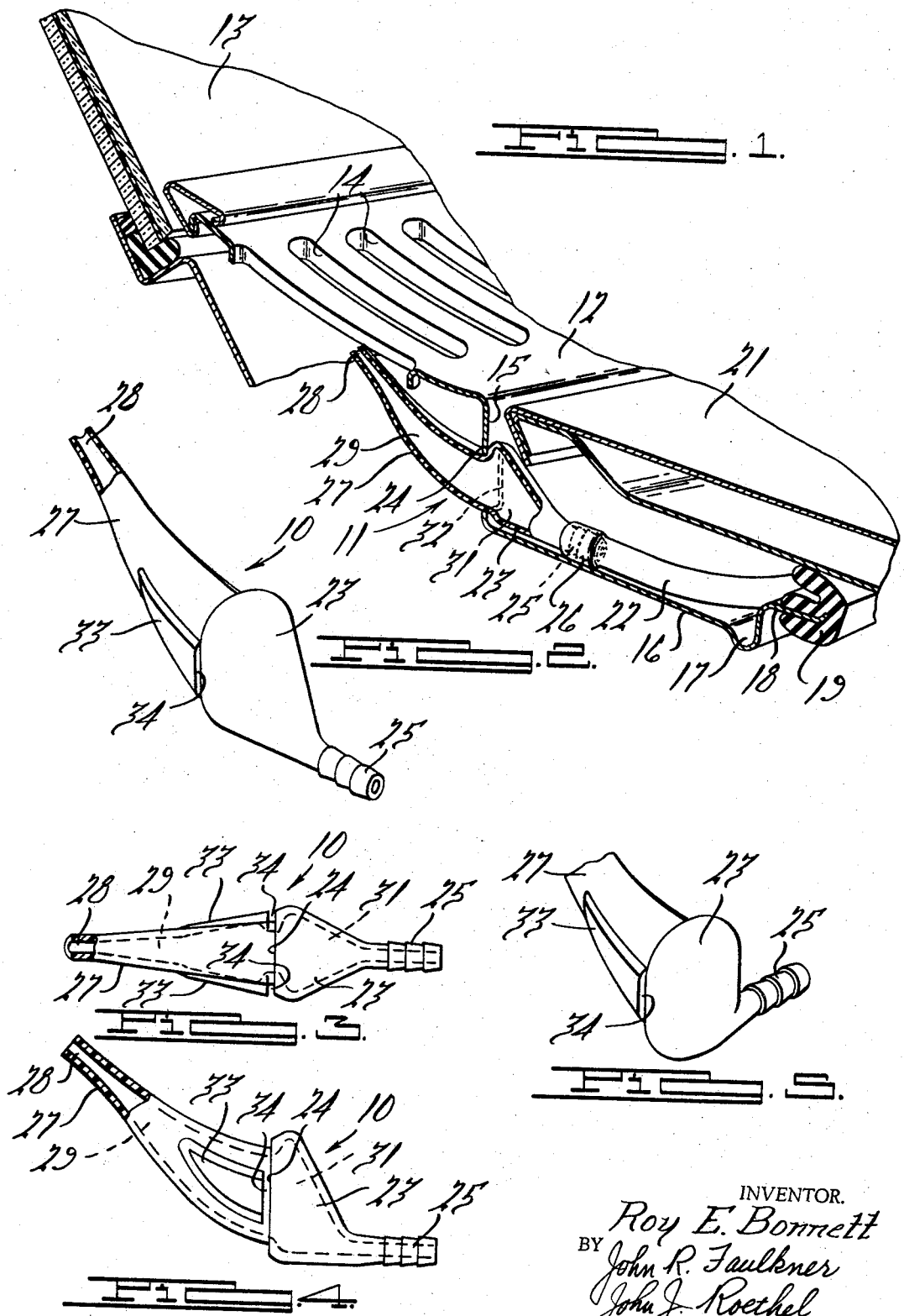

3,406,908
WINDSHIELD WASHER NOZZLE
Roy E. Bonnett, Pontiac, Mich., assignor to Ford Motor Company, Dearborn, Mich., a corporation of Delaware
Filed Jan. 5, 1967, Ser. No. 607,554
2 Claims. (Cl. 239—284)

ABSTRACT OF THE DISCLOSURE

A windshield washer nozzle adapted to be formed of plastic and comprising a body portion having at one end a tapered portion terminating in a jet and at the other end a serrated cylindrical portion adapted to receive a fluid supply hose. Intermediate its ends the nozzle body is provided with snap fit retention means for holding the nozzle in an aperture in a body panel with the jet end directed toward a windshield.

Background of the invention

Many of the presently used windshield washer jet assemblies consist of a formed brass or copper tube which is brased or soldered to a formed steel bracket. This assembly is zinc plated for corrosion protection. The finished assembly is attached to the cowl top vent grille of a vehicle with a single screw.

The present invention proposes the substitution for the foregoing hardware of a blow-molded plastic nozzle, which nozzle may be made of a high density polyethylene or other plastic having similar properties. The blow-molded plastic nozzle is an integral or one-piece unit that can be snapped into a suitable aperture in a cowl top vent grille. No attaching part is required. It can be mass produced at lower cost than the presently used metal nozzle assembly and eliminates an assembly plant operation, i.e., the driving of a screw.

Summary of the invention

A windshield washer nozzle according to the present invention comprises a hollow molded plastic body having at one end a tapered portion terminating in a jet adapted to be directed or aimed in the direction of a vehicle windshield. The plastic body at its other end has a serrated cylindrical portion adapted to receive a fluid supply hose. Intermediate its ends the body has shoulder means adapted to have a snap fit retention in an aperture in a vehicle body panel located in proximity to the windshield.

Brief description of the drawing

Other objects, advantages and features of the present invention will be made more apparent as this description proceeds, reference being had to the accompanying drawings, wherein:

FIG. 1 is a fragmentary perspective view illustrating the installation of a washer nozzle according to the present invention;
FIG. 2 is a perspective view;
FIG. 3 is a plan view of the washer nozzle;
FIG. 4 is a side view of the washer nozzle; and
FIG. 5 is a fragmentary perspective view of a modification of the washer nozzle.

Description of the preferred embodiment

Referring now to FIG. 1, there is illustrated the general environment in which the washer nozzle, generally designated 11, of the present invention is adapted to be used. The washer nozzle is concealed beneath the air intake grille 12 located in front of the windshield 13. The grille 12 has a series of air intake openings 14 beneath any one of which the nozzle may be positioned to project a stream of water on the windshield. The forward exposed edge of the grille 12 terminates in a depending flange 15 which forms a rear wall of a trough 16 having at its forward edge a gutter 17 and a flange 18 carrying a weatherstrip 19. The underside of the hood panel 21 rests on the weatherstrip 19 thereby sealing off the engine compartment. The trough 16 may be utilized to support the rubber or plastic hose 22 leading to a source (not shown) of windshield cleaner fluid (a reservoir and pump unit).

The washer nozzle 11 is designed to be blow-molded from a plastic material, such as a high density polyethylene or other plastic having similar properties. The nozzle 11 has a bulbous body portion 23 terminating at one end in a transverse wall 24 and at its other end in a serrated cylindrical portion 25 adapted to receive the end 26 of the fluid supply hose 22.

Extending from the transverse wall 24 in the opposite direction is a tapered body portion 27 which terminates in a jet 28. The inner cavity 29 of the tapered portion and the inner cavity 31 of the bulbous portion are in communication with each other through a large opening in the transverse wall 24.

The depending flange 15 of the vehicle body grille structure 12 is provided with an opening 32 adapted to receive the nozzle 11 and to cooperate with outer surface parts of the latter to hold the nozzle in position.

The nozzle 11 is retained in place in the panel 15 by flared portions or projections 33 on the side walls of the tapered body portion 27. The flared portions terminate or are undercut short of the transverse wall 24 of the bulbous body portion 23 to form retention grooves 34.

The mounting of the nozzle 11 in the panel 15 is very simple. The tapered body portion 27 is inserted jet end 28 first through the aperture 32 in the flange 15. A moderate amount of pressure in the direction of insertion is required to compress the flared side walls until the grooves 34 are aligned with the panel 15. When properly aligned, the flared side walls will snap outwardly and the adjacent edge portions of the panel 15 will be trapped in the grooves 34 holding the nozzle in position. It will be apparent that the nozzle may easily be removed for cleaning or replacement by squeezing the sides together and then pulling the tapered portion of the nozzle through aperture 32 in the flange 15.

The hose 22 may be attached to the serrated cylindrical end portion 25 of the nozzle before or after insertion of the nozzle in the panel 15. As shown in FIGS. 2 and 5, the serrated end portions can be molded in any desired direction relative to the longitudinal axis of the nozzle. FIG. 2 illustrates the serrated end portion extending longitudinally of the nozzle and FIG. 5 illustrates the serrated end portion at a right angle to the longitudinal axis of the nozzle. The serrated end portion could be molded at an intermediate angle if desired.

It will be understood that the invention is not to be limited to the exact construction shown and described, but that various changes and modifications may be made without departing from the spirit and scope of the invention as defined in the appended claims.

I claim:
1. A windshield washer nozzle comprising:
    a hollow plastic body having at one end a tapered portion terminating in a jet adapted to be directed at a windshield and at its other end in a serrated cylindrical portion adapted to receive a fluid supply hose,
    said body intermediate its ends being formed with a bulbous chamber which terminates at its end nearest the jet end in a transverse wall,
    and retention means intermediate the ends of said body adapted to have snap-fit engagement with the edges of an aperture in a vehicle body panel located in proximity to a windshield, said retention means comprising an outer surface of the transverse wall of said bulbous chamber and panel receiving groove means undercut in the body tapered portion at the juncture of the latter with said transverse wall.

2. A windshield washer nozzle according to claim 1, in which:

the tapered portion of the body has at opposite sides thereof laterally extending flared portions, said flared portions being undercut at the juncture of the tapered body portion with said transverse wall to form the groove means.

References Cited

UNITED STATES PATENTS 3,008,649  11/1961  Bock et al. _____ 239—284
3,056,177  10/1962  Ruhala et al. _____ 239—284
3,067,955  12/1962  Heath _____ 239—284 X M. HENSON WOOD, JR., *Primary Examiner.*

H. NATTER, *Assistant Examiner.*